United States Patent [19]
Föhl

[11] Patent Number: 4,549,768
[45] Date of Patent: Oct. 29, 1985

[54] BELT LOCK FOR A SAFETY BELT

[75] Inventor: Artur Föhl, Schorndorf, Fed. Rep. of Germany

[73] Assignee: Repa Feinstanzwerk GmbH, Alfdord, Fed. Rep. of Germany

[21] Appl. No.: 554,774

[22] Filed: Nov. 23, 1983

[30] Foreign Application Priority Data

Nov. 25, 1982 [DE] Fed. Rep. of Germany ....... 3243643

[51] Int. Cl.⁴ .............................................. B60R 21/00
[52] U.S. Cl. ...................................... 297/468; 24/639; 297/474; 297/481
[58] Field of Search ............... 297/481, 468, 485, 474; 24/639, 640

[56] References Cited

U.S. PATENT DOCUMENTS 2,964,100 12/1960 McCall ................................ 297/474
4,210,365 1/1980 Brietschwerdt et al. ........... 297/481

FOREIGN PATENT DOCUMENTS 2017439 11/1971 Fed. Rep. of Germany ...... 297/481

Primary Examiner—James T. McCall
Attorney, Agent, or Firm—Yount & Tarolli

[57] ABSTRACT

Belt lock for a safety belt, especially for arrangement on a back seat in a motor vehicle, with flexible pulling means which are fastened to a lock housing fastened to a flexible fitting fixed to a vehicle part, for instance, to the seat frame, and which holds the belt lock which is not connected to the safety belt in a predetermined, easy-to-grab position. The pulling means are connected firmly and undetachably to the metallic lock frame within the lock housing.

6 Claims, 6 Drawing Figures

4,549,768

BELT LOCK FOR A SAFETY BELT

BACKGROUND OF THE INVENTION

1. Field of the Invention

This invention relates to a belt lock for a safety belt, especially for arrangement on a back seat in a motor vehicle with flexible pulling means which are fastened to the lock housing fastened to a flexible fitting fixed to a vehicle part, for instance, to a seat frame, and which pulling means holds the belt lock which is not connected to the safety belt in a predetermined, easy-to-grab position.

2. Description of the Prior Art

In a belt lock of this type, which is fastened to the end of a flexible fitting, for instance, to a flexible belt, the requirement arose that the belt lock, if the safety belt is not put on, should always be in a predetermined position, for instance, on the back seat of a motor vehicle, where it is easy to find and actuate for putting the safety belt on. In one known design, flexible pulling means, the free end of which can be connected to the lock housing after it is installed in the motor vehicle, are fastened to the seat frame. For this purpose, the fitting designed as a belt carries a fastening pin sewed into the belt which can be inserted into a recess in the lock housing and can be fastened by snapping it in. Sewing-in the fastening pin and the arrangement of a plug-in recess in the lock housing is cumbersome and expensive.

SUMMARY OF THE INVENTION

An object of the invention is to provide a belt lock with flexible pulling means for arrangement in a motor vehicle which can be manufactured in simplified manner at lower cost and without requiring a special, particularly space-requiring design of the belt lock.

With the foregoing and other objects in view, there is provided in accordance with the invention a belt lock for a safety belt with flexible pulling means for arrangement in a motor vehicle, comprising a belt lock having a metallic lock frame with two parallel, spaced plates in a lock housing, a flexible fitting having one end fastened to the belt lock and the other end of the fitting fixed to a vehicle part, and flexible pulling means for holding the belt lock which is not connected to the safety belt in a predetermined, easy-to-grab position connected at one end firmly and undetachably to the metallic lock frame in the lock housing and the other end of the flexible pulling means fixed to a vehicle part.

Other features which are considered as characteristic for the invention are set forth in the appended claims.

Although the invention is illustrated and described herein as embodied in a belt lock for a safety belt, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

Figure 1:
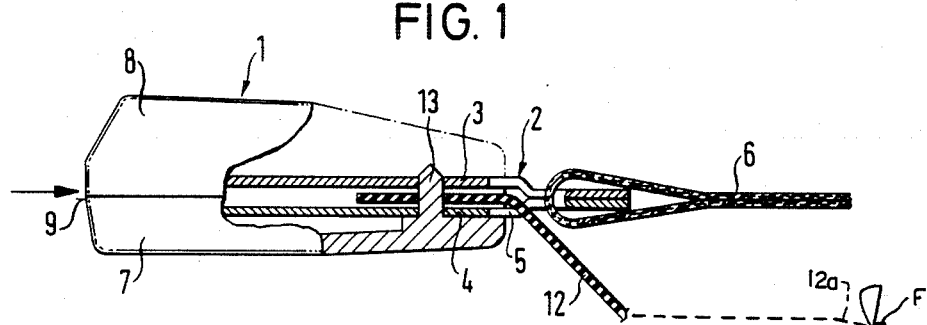
FIGS. 1 and 2 show a schematic view of a first embodiment example of the belt lock with attached flexible pulling means according to the invention in a side view and a top view.

According to the invention, the pulling means are assembled and secured during the assembly of the belt lock. This obviates special plug-in recesses in the lock housing as well as plug-in elements at the flexible pulling means, since there no longer is a subsequent connection of the pulling means and the belt lock made. Thereby, also the overall-size of the belt lock need not be changed in any way as compared to a belt lock without pulling means. This is of importance especially if the belt lock is for a safety belt which is provided for a back seat of a motor vehicle, where customarily the belt lock rests on the seat or is arranged between the passengers of the motor vehicle and where it is desired to keep the dimensions of the belt lock as small as possible for space reasons.

According to a further embodiment of the invention, the free end of the pulling means which is preferably realized in the form of a flexible band, is fastened between the plates of the U-shaped lock frame. Preferably, a pin or post-like fastening element is provided in the region between the plates, which is supported in openings of the plates and serves for securing the pulling means. Because the pulling means are fastened between the plates, no mounting space for the pulling means to be fastened is required outside the lock frame. A very simple mechanical design is obtained by forming a fastening post for the pulling means at the lock housing which is preferably made of plastic. The fastening post is supported in an opening of at least one of the plates.

Further advantageous details of the invention may be seen from the embodiment examples which are shown in the drawings and will be described in the following.

Figure 2:
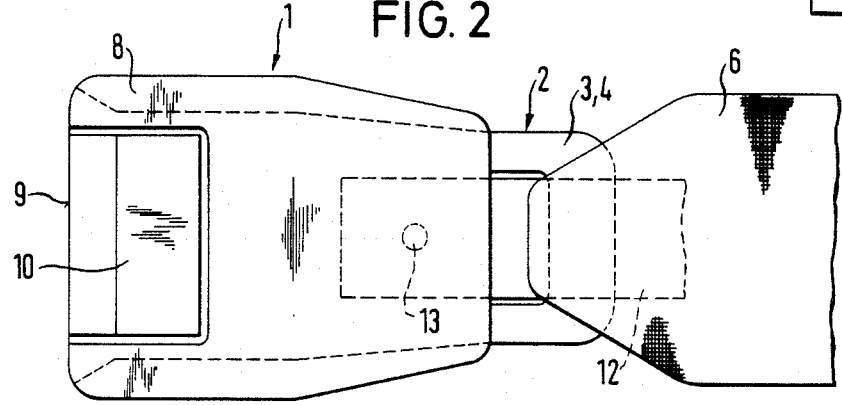

In FIGS. 1 and 2, a belt lock is generally designated with 1. The supporting part of this belt lock 1 is a substantially U-shaped metallic lock frame 2 with mutually parallel plates 3 and 4 which extend beyond the back side of the belt lock and rest against each other there. Plates 3 and 4 are provided with a slot 5, in which a fitting part 6, in the form of a flexible belt band, is fastened by means of a sewed loop. Placed on the lock frame 2 is a lock housing 7/8 consisting of two shells 7 and 8, which lock housing 7/8 has an insertion opening 9 on its frontside. A plug-in tip which is connected to the safety belt but is also not shown, can be inserted into insertion opening 9 in the direction of the arrow shown in FIG. 1 and can be locked. A release button 10 is provided for unlocking the above-mentioned plug-in tip in known manner. The plug-in tip can be inserted into the cavity between the two plates 3 and 4 and can be locked by a latch which is in connection with the release button 10 but is not shown. The flexible fitting 6 is fastened with its other end, for instance, to the seat frame of the back seat of a motor vehicle, where the lock housing rests loosely on the seat if not in use. In order to facilitate finding the lock housing for inserting the tip of the safety belt, flexible, for instance, bandshaped pulling means 12 are provided. The pulling means 12 is connected at one end to the belt lock 1 and fastened, at the opposite end, designated as 12a in FIG. 1, to the seat frame F. The pulling means 12 is arranged, for instance, in the gap between the seat and the back of the seat. The pulling means 12 consist preferably of a rubber-like material which is stretchable in the lengthwise direction and holds the belt lock 1 with pretension at a predetermined point on the seat, where the belt lock is very easy to find. In the embodiment example according to FIGS. 1 and 2, the free end of the pulling means 12 is placed through the slot 5 in the plate 4 between the two plates 3 and 4. The pulling means 12 is fastened between plates 3 and 4 by a fastening post 13 formed onto the shell 7 of the lock housing 7/8 which in FIG. 1 is the lower shell. By placing the shell 7 which consists of plastic on the lock frame 2, the fastening post 13 goes through aligned openings in the two plates 3 and 4 as well as through the pulling means 12 itself. This fastening post 13 is supported in the above-mentioned openings of the plates 3 and 4 by as shown in FIG. 1, a wider base of plastic.

Figure 3:
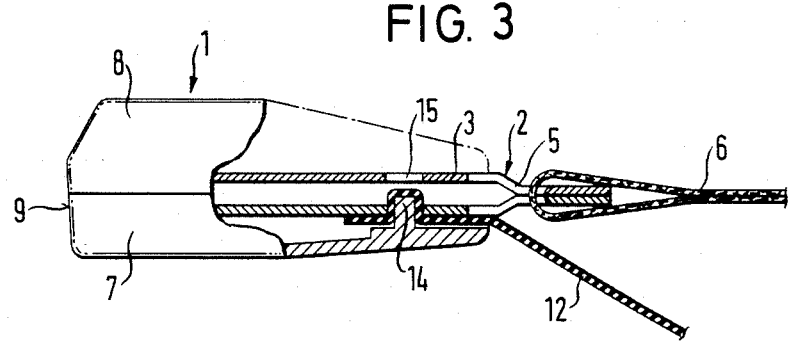
FIG. 3 shows a side view of a second embodiment example.

In the embodiment example according to FIG. 3, a fastening post 14 is likewise formed into the lower shell 7. However, post 14 extends only through an opening in the lower plate 4 and extends slightly above this plate. Here, the flexible pulling means 12 cover the fastening post 14 approximately in the manner of a loop and are clamped between the fastening post 14 and the boundary edges of the plate opening 15 as well as between the fastening post 14 and the base surface of the shell 7.

Figure 4:
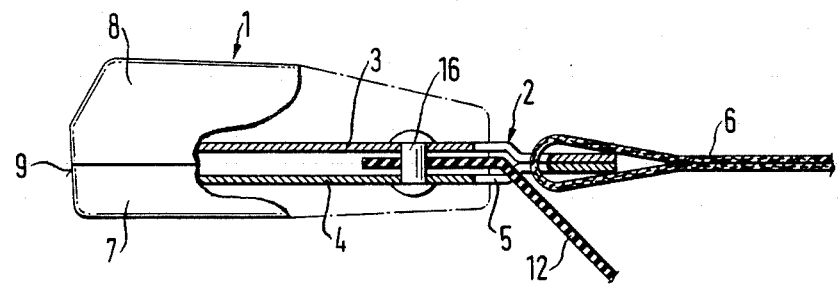
FIGS. 4 and 5 show a third embodiment example of the invention in a side view and top view.
Figure 5:
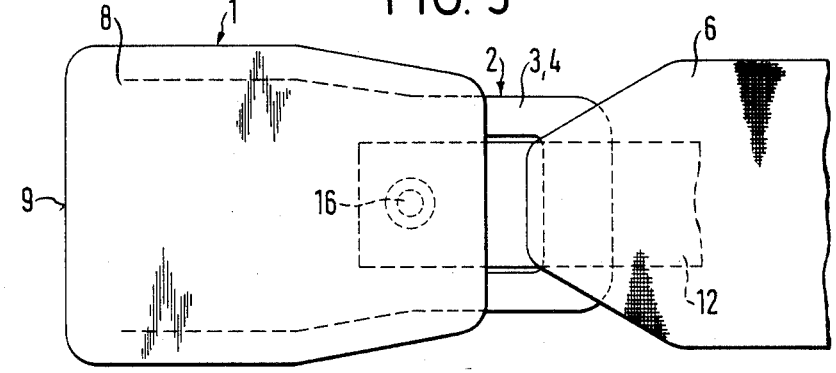

In the embodiment example according to FIGS. 4 and 5, the flexible pulling means 12 are fastened in the cavity between the mutually parallel plates 3 and 4 in substantial agreement with the embodiment example according to FIGS. 1 and 2.

The fastening element employed here is a fastening rivet 16, for instance, a notched rivet or a spreading rivet which is fastened in the openings of the two plates 3 and 4 and goes with its rivet shank through the pulling means 12.

Figure 6:
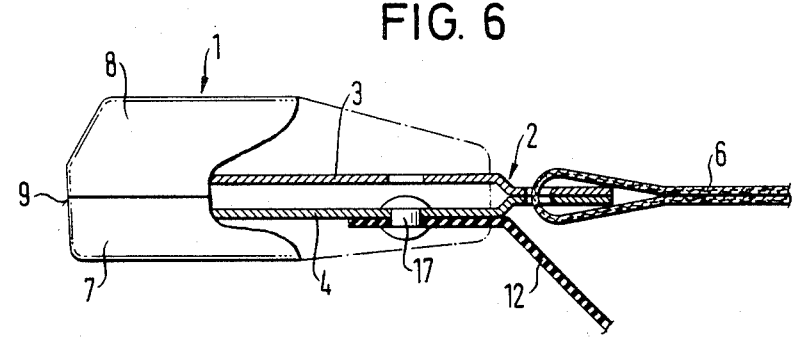
FIG. 6 shows a fourth embodiment example of the belt lock according to the invention.

In the embodiment example according to FIG. 6, the pulling means are fastened on the outside of the lower plate 4 by means of a rivet 17.

The foregoing is a description corresponding, in substance, to German application No. P 32 43 643.2, dated Nov. 25, 1982, international priority of which is being claimed for the instant application, and which is hereby made part of this application. Any material discrepancies between the foregoing specification and the specification of the aforementioned corresponding German application are to be resolved in favor of the latter.

I claim:

1. A belt lock for a safety belt with flexible pulling means for arrangement in a motor vehicle, comprising a belt lock having a metallic lock frame with two parallel, spaced plates in a lock housing, a flexible fitting having one end fastened to the belt lock and the other end of the fitting fixed to a vehicle part, and flexible pulling means for holding the belt lock which is not connected to the safety belt in a predetermined, easy-to-grab position, connected at one end firmly and undetachably to the metallic lock frame in the lock housing and the other end of the flexible pulling means fixed to a vehicle part, a fastening post for the pulling means being formed on the lock housing from which the post extends and is supported in an opening of at least one of the plates.

2. A belt lock for a safety belt with flexible pulling means for arrangement in a motor vehicle, comprising a belt lock having a metallic lock frame with two parallel, spaced plates in a lock housing, a flexible fitting having one end fastened to the belt lock and the other end of the fitting fixed to a vehicle part, and flexible pulling means for holding the belt lock which is not connected to the safety belt in a predetermined, easy-to-grab position, connected at one end firmly and undetachably to the metallic lock frame in the lock housing and the other end of the flexible pulling means fixed to a vehicle part, the lock frame being in the form of a U-shaped lock frame, and wherein the end of the pulling means is fastened between the two plates of the U-shaped lock frame, said end of the pulling means being clamped between the two plates, and a fastening post for the pulling means being formed on the lock housing from which the post extends and is supported in an opening of at least one of the plates.

3. Belt lock with flexible pulling means according to claim 1, wherein both plates have aligned openings, wherein the fastening post protrudes through the opening of one plate of the lock frame and clamps the pulling means covering the fastening post in the aligned opening of the second parallel plate.

4. Belt lock with flexible pulling means according to claim 3 wherein additional clamping of the pulling means is provided by clamping the pulling means between the lock housing carrying the fastening post and said one plate.

5. Belt lock with flexible pulling means according to claim 1, wherein both plates have aligned openings, wherein the fastening post protrudes through the opening of only one plate of the lock frame and clamps the pulling means covering the fastening post in the aligned opening of the second parallel plate.

6. Belt lock with flexible pulling means according to claim 5, wherein additional clamping of the pulling means is provided by clamping the pulling means between the lock housing carrying the fastening post and said only one plate.

* * * * *